United States Patent [19]

Terasawa

[11] Patent Number: 4,556,894

[45] Date of Patent: Dec. 3, 1985

[54] INK-JET TYPE PRINTER AND A FUNCTION RESTORATION SUCTION DEVICE

[75] Inventor: Koji Terasawa, Mitaka, Japan

[73] Assignee: Canon Kabushiki Kaisha, Tokyo, Japan

[21] Appl. No.: 668,673

[22] Filed: Nov. 5, 1984

Related U.S. Application Data

[63] Continuation of Ser. No. 491,994, May 5, 1983, abandoned.

[30] Foreign Application Priority Data

May 11, 1982 [JP] Japan ................................ 57-77545
Jun. 1, 1982 [JP] Japan ................................ 57-94594

[51] Int. Cl.⁴ ............................................ G01D 15/18
[52] U.S. Cl. ............................................... 346/140 R
[58] Field of Search ................................ 346/140, 75

[56] References Cited

U.S. PATENT DOCUMENTS

| | | | |
|---|---|---|---|
| 4,369,454 | 1/1983 | Kyogoku | 346/140 R |
| 4,383,263 | 5/1983 | Ozawa | 346/140 R |
| 4,403,233 | 9/1983 | Terasawa | 346/140 R |
| 4,410,900 | 10/1983 | Terasawa | 346/140 R |

*Primary Examiner*—Joseph W. Hartary
*Attorney, Agent, or Firm*—Fitzpatrick, Cella, Harper & Scinto

[57] ABSTRACT

An ink-jet type printer includes a unit for drawing an ink from the tip of a recording head, a vessel for collecting the waste ink drawn by the drawing unit, a chamber for detachably receiving the vessel, and a unit for permitting the vessel to collect the waste ink when the vessel is mounted in the chamber and for inhibiting the vessel from collecting the waste ink when the vessel is not mounted in the chamber.

14 Claims, 10 Drawing Figures

INK-JET TYPE PRINTER AND A FUNCTION RESTORATION SUCTION DEVICE

This application is a continuation of application Ser. No. 491,994 filed May 5, 1983 now abandoned.

BACKGROUND OF THE INVENTION

1. Field of the Invention

The present invention relates to an ink-jet type printer and a function retrieval suction device for use in the same.

2. Description of the Prior Art

There is known an ink-jet type printer in which an ink is supplied from a detachable ink vessel to recording head nozzles. In such a printer, it becomes impossible to continue any printing if the ink vessel is not mounted in the printer since the ink is not supplied to the nozzles. The nozzles used in the ink-jet printer are of an extremely small diameter. If the nozzles are not used for a long time, the ink may dry or cause itself to create bubbles so that the ink will not be discharged from the nozzles. In order to overcome this, the ink-jet type printer is generally provided with a function retrieval suction device.

This device includes a cap which is mounted over the tip of a nozzle head and adapted to connect with a source of negative pressure through a flexible tube. Immediately before use, the cap is connected to the source of negative pressure to suck the ink from the nozzles so that the interior of the nozzles will be cleared to restore its proper function. The sucked ink is pumped to and collected in a waste ink tank which is mounted in the printer.

In a printer having such a structure, the waste ink tank is often formed integrally with an exchangeable ink cassette. When the ink cassette is replaced by a new ink cassette, therefore, the waste ink tank may also be discarded.

If the ink is drawn out of the nozzles under suction when the ink cassette provided with the waste ink tank is not mounted in the printer, the sucked ink is scattered in the interior of the printer to make the internal components thereof and recording papers dirty.

Where the waste ink tank is separated from the ink supply tank, there may be such a state that the waste ink tank is properly set in the printer while the ink supply tank is not mounted therein. In such a state, the ink will not be discharged from the nozzles since air is drawn into the nozzles without supply of ink if the suction is provided for the purpose of restoring the function of the nozzles.

SUMMARY OF THE INVENTION

It is an object of the present invention to provide an ink-jet type printer and function restoration suction device which can eliminate any problem resulting from an ink vessel not being mounted in the printer.

Another object of the present invention is to inhibit a function restoration suction when the vessel is not mounted within a vessel receiving chamber.

Still another object of the present invention is to permit a capping to a recording head even if the vessel is not mounted in the vessel receiving chamber.

A further object is to prevent the ink sucked from the recording head from making the circumference dirty when the vessel is not mounted in the vessel receiving chamber.

A further object is to provide an ink-jet type printer which inhibits any sucking action to the tip of the recording head by the use of a cam face in the ink vessel.

A further object is to inhibit the suction under negative pressure when the vessel is joined to a connection.

A further object is to inhibit any suction when an ink vessel consisting of a first reservoir containing a fresh ink to be supplied to the recording head and a second reservoir storing the waste ink is not mounted in the printer.

A further object is to provide a function retrieval suction device including a lever which is first moved downwardly to a predetermined position to hold a cap at its closing position and further moved in the same direction to release the cap from its closing position.

A further object is to release the cap from its closing position only after the suction has been provided.

A further object is to provide an ink-jet type printer in which the cap is held at its closing position when it is being detected to mount no ink vessel.

A further object is to provide an ink-jet printer in which it is inhibited to release the cap from its closing position when it is detected that the first reservoir means for supplying the fresh ink to the recording head and the second reservoir means for collecting the waste ink are simultaneously absent from the housing.

A further object is to provide an ink-jet printer in which the suction is inhibited when the first ink reservoir means for supplying the fresh ink to the recording head and the second ink reservoir means for collecting the waste ink are simultaneously absent from the housing.

A further object is to provide a function retrieval suction device comprising means for inhibiting a waste ink reservoir from collecting the waste ink when it is not mounted within a vessel receiving chamber.

A further object is to block an ink passageway when the waste ink reservoir is not mounted.

A further object is to be able to carry out a function retrieval suction and then a recording operation even if the vessel is not mounted.

Other objects will be apparent from reading the following description of the present invention in connection with the drawings.

DESCRIPTION OF THE PREFERRED EMBODIMENTS

Figure 1:
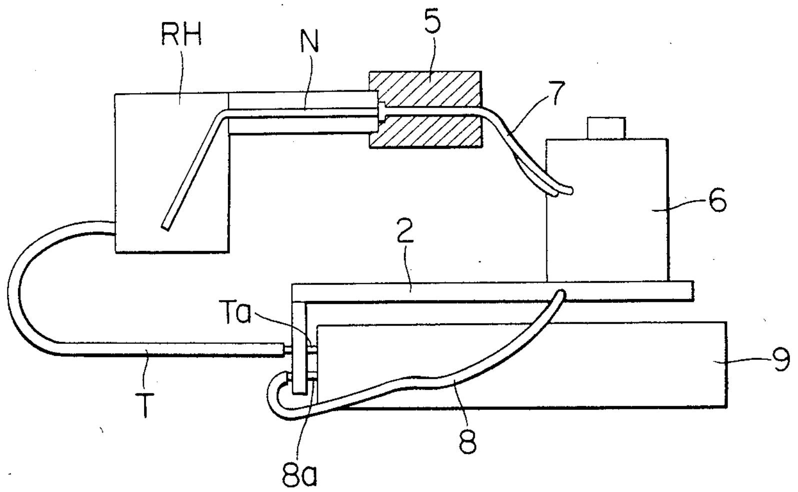
FIG. 1 is a schematic view of a first embodiment according to the present invention.

FIG. 1 schematically shows the construction of an ink-jet printer which is one embodiment of the present invention. The ink-jet printer comprises a recording head RH in which a body of ink is contained. The ink is fed to and discharged from an ink-jet nozzle assembly N. The recording head RH is moved along guide rails (not shown) in the direction perpendicular to the drawing. The recording head RH is connected to an ink vessel 9 through a supply tube T and supplied with the fresh ink from the ink vessel 9. The tip of the recording head RH is sealingly closed by an openable cap 5 which is connected to a suction pump 6 through a tube 7. The suction pump 6 is in turn connected to the ink vessel 9 through a tube 8.

Figure 2:
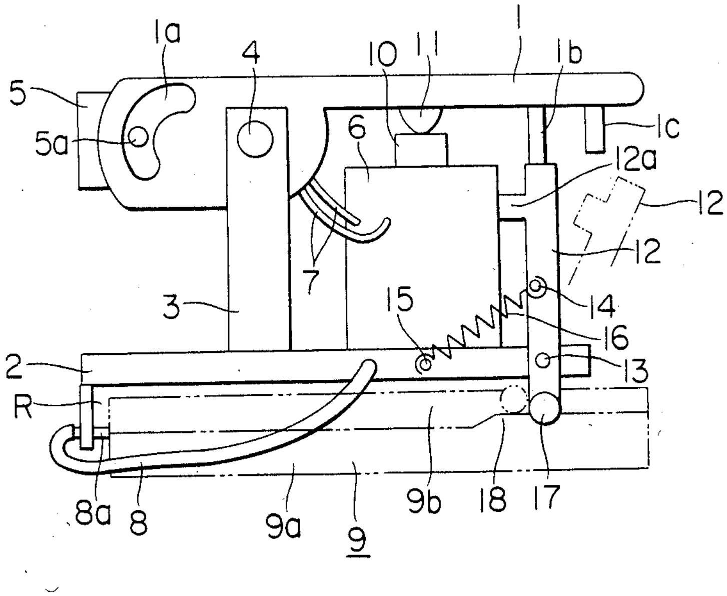
FIG. 2 is a side view of a function restoration suction mechanism.

FIG. 2 shows the detailed structure of a function restoration suction mechanism in the ink-jet printer. In this figure, there is shown an actuating lever 1 used to carry out a capping operation and a function restoration suction operation. The actuating lever 1 is rotatably supported on the top of a post 3 through a pin 4, the post 3 being in turn supported on a base 2. The lever 1 can externally operated. A grooved cam 1*a* is formed in the actuating lever 1 adjacent the proximal end thereof and receives a pin 5*a* on the cap 5.

The cap 5 is provided with a resilient seal for sealing between the tip of the recording head RH and the cap 5 fitted thereover. In such a state as shown in FIG. 2, the tip of the nozzle assembly N is sealingly closed by the cap. The suction pump 6, which functions as a source of negative pressure, is fixed to the top face of the base 2 and connected to the cap 5 through the tubes or passageways 7. The suction pump 6 is also connected to a waste ink reservoir 9*a* in the ink vessel 9 through the tube or passageway 8. The ink vessel 9 consists of the combination of the waste ink reservoir 9*a* with another reservoir 9*b* which contains the fresh ink to be supplied to the recording head. The ink vessel 9 is detachably mounted in a vessel receiving chamber R which is defined by the base 2 and a chassis (not shown) of the printer. A hollow needle 8*a* is removably penetrates into a blind plug (not shown) in the waste ink reservoir 9*a* to connect the waste ink reservoir 9*a* with the suction pump 6. The hollow needle 8*a* is fixed to the bottom end of the base 2. As shown in FIG. 1, the tube T from the recording head RH is similarly connected with the fresh ink reservoir 9*b* through a hollow needle Ta which is also fixed to the base 2.

The suction pump 6 includes a piston rod 10 positioned opposed to a projection 11 on the inner face of the actuating lever 1. When the actuating lever 1 is pivoted clockwise as viewed in FIG. 2, the piston rod 10 is pushed by the projection 11 to suck the ink from the tip of the nozzle assembly through the tube 7, so that the waste ink retained in the nozzle assembly is purged therefrom and pumped into the waste ink reservoir 9*a* in the ink vessel 9 through the tube 8.

A stop lever 12 is rotatably mounted at one end on the base 2 through a pin 13. The stop lever 12 functions to detect whether the ink vessel 9 is housed in the vessel receiving chamber R or not, so that the sealing between the cap 5 and the recording head will be released or the function restoration suction will be inhibited. The stop lever 12 includes a projection 12*a* provided on the side thereof adjacent the free end of the lever and extending toward the suction pump 6. The stop lever 12 also includes a pin 14 provided thereon intermediate between the ends of the stop lever and on which a spring 16 is mounted at one end. The spring 16 extends from the pin 14 to a pin 15 on the base 2 and urges the stop lever 12 counter-clockwise as viewed in FIG. 2. The bottom end of the stop lever 12 supports a roller 17 rotatably. This roller 17 is in a position in which it can contact with a cam face 18 on the outer wall of the ink vessel 9.

Thus, the stop lever 12 is pivoted counter-clockwise as viewed in FIG. 2 under the tension of the spring 16 when the ink vessel 9 is set in the vessel receiving chamber R. At this time, the projection 12*a* engages with the side of the suction pump 6 to hold the stop lever 12 at its vertical position as shown in FIG. 2. Even if the actuating lever 1 is, in such a state, depressed to move the piston rod 10 downward through the projection 11, the depression of the actuating lever 1 is interfered with by engagement of a projection 1*b* adjacent the free end of the actuating lever 1 with the top end of the stop lever 12, so that the suction operation will not be carried out even by depressing the actuating lever 1. Accordingly, any waste ink will not be pumped to discharge into the interior of the printer to make it dirty.

In the just mentioned state, the ink reservoir 9*b* is not connected to the recording head RH. However, no air will be drawn in the nozzle assembly since the suction is not carried out as described above.

If the ink vessel 9 is mounted in the printer, the roller 17 on the stop lever 12 rides on the cam face 18 so that the stop lever 12 is rotated clockwise about the pin 13 to such a position as shown by chain line in FIG. 2. Thus, the suction will be permitted. However, the interior of the printer will not be made dirty since any sucked waste ink can be pumped into the waste in reservoir.

A cap opening mechanism will now be described with reference to FIG. 3.

A cap lever 19 is disposed side by side relative to the stop lever 12 although the cap lever 19 is not shown in FIG. 2. The cap lever 19 is rotatably mounted on a shaft 21 extending from a supporting member 20 as shown in FIG. 3. The shaft 21 is received by an opening 19*a* formed in the cap lever 19 and which has a diameter substantially smaller than the internal diameter of the opening 19*a*. Thus, the cap lever 19 can not only rotate about the shaft 21, but also swing along the axis of the shaft 21. A coiled torsion spring 22 is located around the shaft 21 to urge the cap lever 19 away from the supporting member 20 and also to correct the clockwise rotation of the cap lever 19 as viewed in FIG. 2.

A stopper 23 is provided on the lower end of the cap lever 19 in a position in which the stopper 23 is opposed to one side of the cap lever 19. The stopper 23 includes a notch formed therein which is engaged by the lower end of the cap lever 19. At this point, thus, the cap lever 19 cannot be pivoted clockwise and moved forward in the presence of the stopper 23.

The actuating lever 1 also includes an L-shaped hook 1*c* formed thereon at the free end thereof. The hook 1*c* is adapted to engage with a notch 19*b* formed on the cap lever 19 at the top end thereof. This notch 19*b* formed on the cap lever 19 at the top end thereof. This notch 19*b* has a bottom sloping surface 19*c*. *The cap lever 19 has its top face 19d* sloping downward toward the notch 19*b*.

Figure 3:
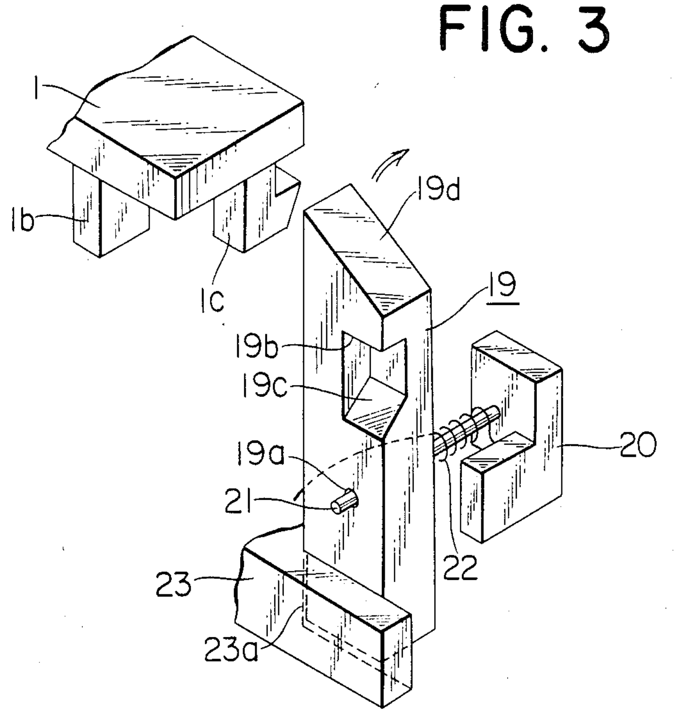
FIG. 3 is a perspective view of a cap opening mechanism.
Figure 4:
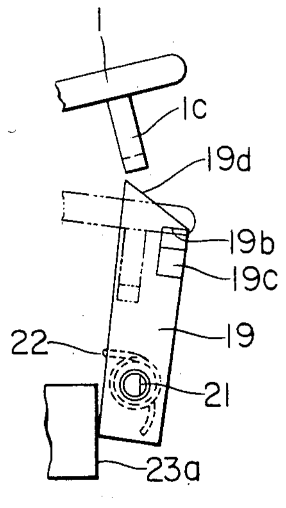
FIGS. 4, 5 and 6 illustrate the operation of the cap opening mechanism.

The cap lever 19 having the above mentioned structure will be operated by the actuating lever 1 as follows:

First of all, the cap lever 19 is slightly pivoted clockwise as viewed in FIGS. 3 and 4 under the influence of the coiled torsion spring 22 if the actuating lever 1 is not depressed. In such a state, the cap is not fitted over the nozzle assembly so that suction will not be carried out.

After the ink vessel is set in the printer and if the actuating lever 1 is depressed to carry out the suction operation, the hook 1*c* engages with the top sloping face 19*d* of the cap lever 19 to move the latter counter-clockwise as viewed in FIG. 3. Thus, the hook 1*c* slides on the top sloping face 19*d* of the cap lever 19 into the notch 19*b*. This is shown in FIG. 4. The cap lever 19 is held at its vertical position while at the same time the cap 5 is fitted over the recording head RH, being ready for a function restoration suction operation.

Figure 6:
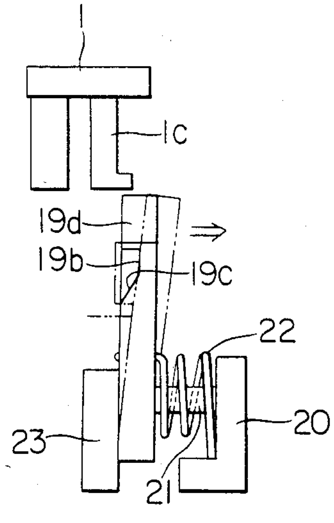

In such a state, the actuating lever 1 may be depressed if the ink vessel 9 is set within the printer. If the actuating lever 1 is depressed, the suction is provided while at the same time the hook 1*c* moved downwardly along the sloping face 19*c* of the notch 19*b* so that the cap lever 19 is displaced toward the supporting member 20 against the influence of the torsion spring 22 to a position as shown by chain line in FIG. 6. When the hook 1*c* is thereafter moved on the side of the cap lever 19 out of the notch 19*b*, the cap lever 19 is returned to its original position shown in FIG. 4 under the influence of the torsion spring 22 to release the cap 5.

Figure 5:
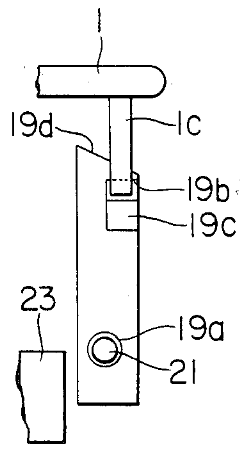

In other words, even if the ink cassette is mounted in the printer, the actuating lever 1 cannot return to its original position unless a suction operation is carried out. This is because the hook 1*c* is engaged by the notch 19*b* as shown in FIG. 5. Therefore, the cap 5 can be released only after a function retoration suction operation has been carried out. Thus, a good recording can be obtained.

If the ink vessel 9 is not set within the vessel receiving chamber R, the actuating lever 1 is prevented from moving downward in the presence of the stop lever 12 as mentioned hereinbefore. Thus, the hook 1*c* on the actuating lever 1 cannot be disengaged from the notch 19*b* of the cap lever 19 to release the cap 5 from the recording head RH. In such an arrangement, no recording operation will be effected when the ink vessel 9 is not set in the printer.

The present invention is not limited to the above mentioned embodiment. For example, the ink vessel may include an ink-supply and waste-ink reservoirs which are separately formed. In this case, the release of the cap and/or the function restoration suction may be inhibited if either of the reservoirs is not set in the printer.

Figure 7:
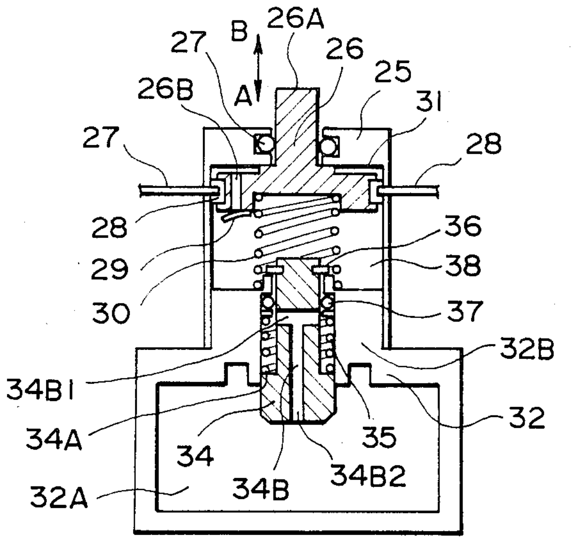
FIG. 7 is a cross-sectional view of a second embodiment of the function restoration suction device according to the present invention.

FIG. 7 shows an ink-jet type function restoration suction device in the form of a manually operated pump which is a second embodiment of the present invention and suitable for use in the ink-jet type printer shown in FIG. 1. The function restoration suction device includes a cylinder 25 forming the upper wall thereof. The cylinder 25 slidably receives a piston 26 which moves axially along the inner wall of the cylinder. The cylinder 25 has openings formed therein at the side wall thereof which are connected with an ink suction tube 27 and an air inlet tube 28 which function to draw excessive ink and air from a recording head, respectively. The piston 26 includes a rod 26A formed therein at the top thereof which extends outward through an aperture which is formed through the top wall of the cylinder 25. O-ring seal 27 is located in the aperture around the piston rod 26A. On the outer periphery of the piston 26 is rigidly mounted a sealing ring 28A of an elastomeric material such as a synthetic rubber to sealingly engage with the inner wall of the cylinder 25. The piston 26 also has a passageway 26B formed axially therethrough and which is provided with a check valve 29 located at the underside of the piston 26. This check valve 29 is in the form of a synthetic resin film. The piston 26 is urged upward by means of a coiled return spring 30.

When the piston 26 is moved downward against the bias of the return spring 30 in the direction A of FIG. 7, the check valve 29 closes the passageway 26B so as to create a negative pressure in a space defined by the piston 26 and cylinder 25. Due to this negative pressure, ink and air are drawn from the recording head through the ink suction tube 27 and air inlet tube 28, respectively. If the piston 26 is released in its depressed position, it is moved upward under the bias of the return spring 30 in the direction B of FIG. 7. At this point, the check valve 29 opens the passageway 26B so that the drawn ink and air will be discharged from the space 31 through the passageway 26B into another space below the piston 26.

The cylinder 25 has a lower opening at which it is mounted sealingly on a base 32. The base 32 forms a chamber 32A for receiving a waste ink cassette 33 which is in the form of a vessel for collecting the waste ink which has been drawn from the recording head. The base 32 also includes an opening formed therethrough which connects the chamber 32A with the interior of the cylinder 25. Within this connecting opening is mounted an anti-leakage valve 34 which functions selectively to connect the interior of the cylinder with the chamber 32A. The anti-leakage valve 34 is urged downward by means of a coil spring 35 in the direction A of FIG. 7. The downward movement of the anti-leakage valve 34 is limited by a snap ring 36 while the upward movement thereof is limited by a step 34A formed in the valve 34 intermediate between the ends thereof. An O-ring seal 37 is provided to seal between the connecting opening and the anti-leakage valve 34. The anti-leakage valve 34 has a T-shaped passage 34B formed therein.

Figure 8:
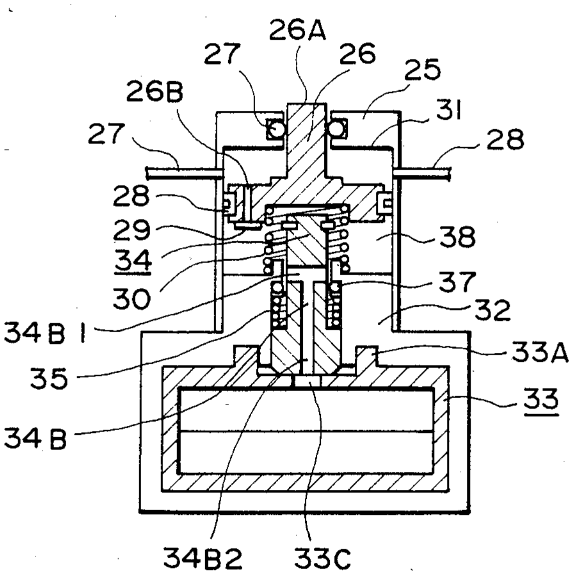
FIG. 8 is a cross-sectional view showing the function restoration suction device of FIG. 7 in such a state that a cassette is mounted therein.
Figure 9:
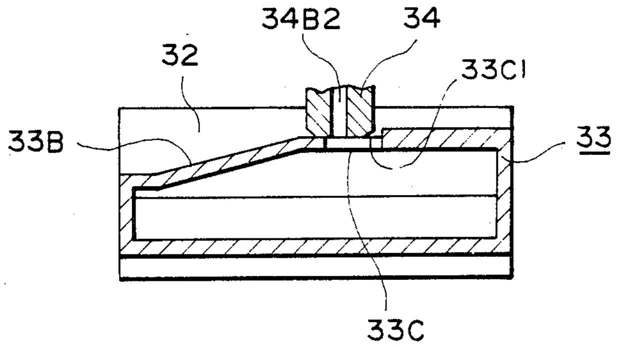
FIG. 9 is a cross-sectional view of the waste ink cassette.

The waste ink cassette 33 has projections 33A formed therein at the top wall thereof which are slidably moved into guide grooves 32B in the top wall of the chamber 32A to mount the waste ink cassette in the chamber as shown in FIG. 8. As the cassette is being mounted in the chamber 32A, the anti-leakage valve 34 is moved upward under engagement with the top sloping face 33B of the cassette 33 to open the lateral passage portions 34B1 of the passage 34 above the O-ring seal 37. As a result, the space 38 defined by the underside of the cylinder 26, the inner wall of the cylinder 25 and the top wall of the base 32 communicates with the interior of the waste ink cassette 33 through the passage 34B and the inlet port 33C formed in the top wall of the cassette 33, so that the ink contained in the space 38 can be discharged into and collected in the cassette. If the waste ink cassette 33 is mounted in the chamber 32A and when the piston 26 is moved to its lowermost position, it is so designed that the bottom face of the piston will not engage with the upper face of the anti-leakage valve 34. Thus, the anti-leakage valve 34 will not interfere with the downward movement of the piston 26, so that any function restoration suction will not adversely be affected by the anti-leakage valve 34. Even when the waste ink cassette 33 is mounted in the chamber 32A, the anti-leakage valve 34 does not sealingly close the inlet port 33C of the cassette 33. The passage 34B is thus in communication with the exterior through gap 33C1 so that the interior of the cassette 33 connects to the atmosphere at all times.

When the waste ink cassette 33 is not mounted in the chamber 32A, the lateral passage portions 34B1 of the passage 34B are positioned below the O-ring seal 37 to sealingly close the space 38. Therefore, any ink contained in the space 38 will not leak to make the surrounding components dirty. If the cassette 38 is filled with the waste ink, the cassette can be replaced by a new cassette.

Figure 10:
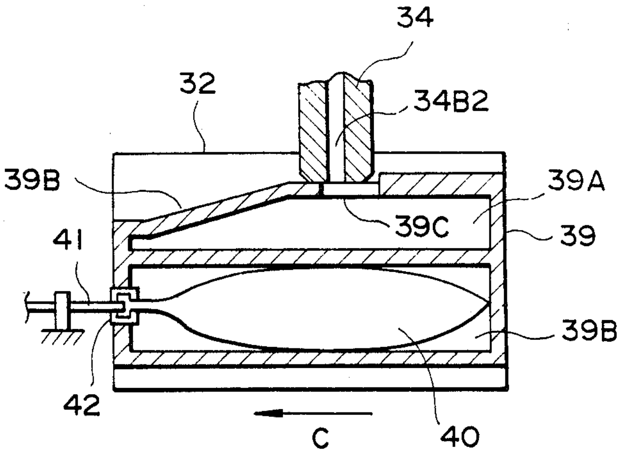
FIG. 10 is a cross-sectional view of a modified waste ink cassette.

FIG. 10 shows a modified embodiment of the waste ink cassette according to the present invention. This waste ink cassette 39 is divided into two chambers, a waste ink reservoir chamber 39A and a chamber 39B for receiving a main ink tank 40. The ink cassette 39 includes a top sloping face 39B and an inlet port 39C which are formed therein. The main ink tank receiving chamber 39B is provided with an elastomeric plug 42 which is formed therein at the side thereof faced to the ink-jet type printer and connected with a connection needle 41 which is connected with the recording head. In such an arrangement, the main ink tank 40 and waste ink reservoir 39A can immediately be utilized only by inserting the ink cassette 39 into the device in the direction C of FIG. 10.

The present invention is not limited to the abovementioned embodiments. The present invention may be applied, with equal advantages, to power operated suction mechanisms other than the manually operated function restoration suction devices which have been described with reference to the drawings.

I claim:

1. An ink-jet type printer comprising means for retrieving an ink from the ink discharging tip of a recording head, a vessel receiving chamber for detachably receiving a vessel in which the ink is contained, and means for detecting whether or not said ink vessel is mounted in said vessel receiving chamber and for inhibiting the actuation of said retrieving means if it is detected that said vessel is not set within said vessel receiving chamber.

2. An ink-jet type printer as defined in claim 1 wherein said retrieving means includes a cap member for sealingly closing the ink discharging tip of the recording head, a source of negative pressure, and actuating means for initiating the retrieving operation by creating a negative pressure in said source of negative pressure after the tip of the recording head has been sealingly closed by said cap member.

3. An ink-jet type printer as defined in claim 1 wherein said vessel includes a waste ink reservoir in which the waste ink is collected, said waste ink reservoir being removably connected to a passageway which communicates with said retrieving means.

4. An ink-jet type printer comprising means for creating a negative pressure by which the ink discharging tip of a recording head is sucked, a first lever for actuating said negative pressure creating means, a vessel containing an ink therein and having a cam face formed thereon at the outer wall thereof, and a second lever engaging at one end with the cam face of said vessel, said second lever being adapted to move such that said first lever is engaged by said second lever to inhibit said negative pressure means from actuating when said vessel is located in place engaging said second lever.

5. An ink-jet printer as defined in claim 4 further comprising a connection adapted to connect with the interior of said vessel when said vessel is located in place engaging said second lever.

6. An ink-jet printer as defined in claim 5 wherein said vessel includes a first reservoir containing an ink to be supplied to said recording head and a second reservoir containing the waste ink sucked from said recording head under the action of negative pressure, said reservoirs being connected to each other through said connection.

7. An ink-jet printer comprising capping means for sealingly closing the ink discharging tip of a recording head, a lever for moving said capping means between a first position in which said recording head is sealingly closed by said capping means and a second position in which said recording head is opened, and means for engaging said lever to inhibit it from moving when said lever is moved to a predetermined position in a predetermined direction and for releasing said lever when said lever is further moved in said predetermined direction.

8. An ink-jet printer as defined in claim 7 further comprising means for sucking the tip of said recording head through said capping means, said sucking means being adapted to actuate when said lever is further moved from said predetermined position in said predetermined direction.

9. An ink-jet type printer comprising capping means for sealingly closing the ink discharging tip of a recording head, a vessel receiving chamber for detachably receiving a vessel in which an ink is contained, and means for detecting whether or not the vessel is received in said vessel receiving chamber and for inhibiting the release of said capping means from its closing position when it is detected that the vessel is not set within said vessel receiving chamber.

10. An ink-jet printer comprising capping means for sealingly closing the ink discharging tip of a recording head, means for sucking the tip of the recording head through said capping means, a first reservoir means containing an ink to be supplied to the recording head, a second reservoir means containing the waste ink sucked from the recording head under the action of said sucking means, a chamber receiving said first and second reservoir means, and means for detecting whether or not both said first and second reservoir means are received by said chamber and for inhibiting the release of said capping means from its closing position when it is detected that both said first and said reservoir means are not set within said chamber.

11. An ink-jet printer comprising capping means for sealingly closing the ink discharging tip of a recording head, means for sucking the ink discharging tip of said recording head through said capping means, a first ink reservoir means containing an ink to be supplied to the recording head, a second ink reservoir means for collecting the waste ink sucked from the recording head under the action of said sucking means, a chamber for receiving said first and second reservoir means, and means for detecting whether or not both said first and second reservoir means are received by said chamber and for inhibiting the actuation of said sucking means when it is detected that both said first and second reservoir means are not set within said chamber.

12. A function restoration suction device comprising means for drawing an ink from the tip of a recording head, a vessel for collecting the waste ink drawn by said drawing means, a vessel receiving chamber for detachably receiving said vessel, and means for permitting said vessel to collect the drawn waste ink when said vessel is mounted in said chamber and for inhibiting said vessel from collecting the waste ink when said vessel is not mounted in said chamber.

13. A function restoration suction device as defined in claim 12 wherein said permitting and inhibiting means includes a valve for closing a passageway between said vessel and said ink drawing means when said vessel is not mounted in said chamber.

14. A function restoration suction device as defined in claim 12 wherein said drawing means is effective both when said vessel is mounted in said chamber and when said vessel is not mounted in said chamber.

* * * * *

UNITED STATES PATENT AND TRADEMARK OFFICE
CERTIFICATE OF CORRECTION

PATENT NO. : 4,556,894

DATED : December 3, 1985

INVENTOR(S) : KOJI TERASAWA

It is certified that error appears in the above-identified patent and that said Letters Patent is hereby corrected as shown below:

Col. 8, line 13, change "said recording" to --the recording--.

Col. 8, line 15, change "said recording" to --the recording--.

Col. 8, line 22, change "said recording" to --the recording--.

Col. 8, line 48, change "said reservoir means" to --second reservoir means--.

Col. 8, line 52-3 change "said recording" to --the recording--.

Col. 3, line 24, change "can" to --can be--.

Col. 3, line 43-4 change "8a is removably pene-/trates into a blind" to

--8a removably penetrates a blind--.

Col. 4, line 26, change "drawn in" to --drawn into--.

Col. 4, line 34, change "in" to --ink--.

Col. 4, line 60-1 delete "This notch 19b...top end thereof."

Col. 4, lines 62-3, change "The cap lever 19/ has its top face 19d sloping" to

--The cap lever 19 has its top face 19d sloping--.

UNITED STATES PATENT AND TRADEMARK OFFICE

CERTIFICATE OF CORRECTION

PATENT NO. : 4,556,894

DATED : December 3, 1985

INVENTOR(S) : KOJI TERASAWA

It is certified that error appears in the above-identified patent and that said Letters Patent is hereby corrected as shown below:

Col. 5, line 31, change "retoration" to --restoration--.

Col. 7, lines 26-7 change "abovemen-/tioned" to --above-mentioned--.

Signed and Sealed this

Fourth Day of November, 1986

[SEAL]

*Attest:*

DONALD J. QUIGG

*Attesting Officer*

*Commissioner of Patents and Trademarks*